US010850566B2

(12) United States Patent
Delfino et al.

(10) Patent No.: US 10,850,566 B2
(45) Date of Patent: Dec. 1, 2020

(54) SPOKE FABRICATION FOR A NON-PNEUMATIC WHEEL

(71) Applicants: Compagnie Generale des Etablissements Michelin, Clermont-Ferrand (FR); Michelin Recherche et Technique S.A., Granges-Paccot (CH)

(72) Inventors: Antonio Delfino, Givisiez (CH); Philippe Berguerand, Givisiez (CH); Pascal Schroeter, Givisiez (CH); Maeike Blanc, Givisiez (CH)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 326 days.

(21) Appl. No.: 15/780,371

(22) PCT Filed: Oct. 30, 2015

(86) PCT No.: PCT/IB2015/058420
§ 371 (c)(1),
(2) Date: May 31, 2018

(87) PCT Pub. No.: WO2017/072562
PCT Pub. Date: May 4, 2017

(65) Prior Publication Data
US 2018/0345718 A1 Dec. 6, 2018

(51) Int. Cl.
B60C 7/14 (2006.01)
B60B 9/26 (2006.01)
(Continued)

(52) U.S. Cl.
CPC .............. *B60C 7/14* (2013.01); *B60B 1/0261* (2013.01); *B60B 1/0269* (2013.01); *B60B 9/26* (2013.01); *B60B 5/02* (2013.01); *B60C 2007/146* (2013.01)

(58) Field of Classification Search
CPC .. B60C 7/14; B60C 7/143; B60C 7/18; B60C 2007/146; B60C 2007/107; B60B 9/26; B60B 1/0261; B60B 1/0269
See application file for complete search history.

(56) References Cited

U.S. PATENT DOCUMENTS 5,915,796 A    6/1999  Beyer
6,615,885 B1 * 9/2003  Ohm ........................ B60B 9/26
                                                    152/11
(Continued)

FOREIGN PATENT DOCUMENTS

EP    1304238 A1    4/2003
GB     160070 A  *  3/1921  ............... B60B 9/26
(Continued)

OTHER PUBLICATIONS

International Search Report for PCT/IB2015/058418 dated Jun. 28, 2016.
(Continued)

*Primary Examiner* — Kip T Kotter
(74) *Attorney, Agent, or Firm* — Dority & Manning, P.A.

(57) ABSTRACT

An exemplary spoke for a non-pneumatic wheel. The spoke can be manufactured with a reinforcement structure having reinforcement elements and one or more layers of material. The spoke can also be provided in various shapes and configurations. The spoke includes anchors that allow the spoke to be more readily incorporated into, or removed from, a non-pneumatic wheel. More particularly, the anchors also allow the spoke to be joined as one-piece with the
(Continued)

non-pneumatic wheel or releasably connected on one or both ends with the non-pneumatic wheel.

14 Claims, 10 Drawing Sheets

(51) Int. Cl.
 *B60B 1/02* (2006.01)
 *B60B 5/02* (2006.01)

(56) References Cited

U.S. PATENT DOCUMENTS

| | | | |
|---|---|---|---|
| 7,201,194 B2 * | 4/2007 | Rhyne | B60B 9/04 |
| | | | 152/11 |
| D763,785 S * | 8/2016 | Abe | D12/605 |
| 9,550,393 B2 * | 1/2017 | Abe | B60C 7/18 |
| 10,399,381 B2 * | 9/2019 | Hasegawa | B60C 7/26 |
| 2007/0267116 A1 * | 11/2007 | Rhyne | B60C 11/0306 |
| | | | 152/246 |
| 2008/0191543 A1 | 8/2008 | Saillet | |
| 2010/0200131 A1 * | 8/2010 | Iwase | B60C 17/061 |
| | | | 152/209.1 |
| 2013/0048174 A1 * | 2/2013 | Cron | B60C 7/10 |
| | | | 152/324 |
| 2013/0240097 A1 * | 9/2013 | Cron | B60B 9/26 |
| | | | 152/17 |
| 2014/0367007 A1 | 12/2014 | Thompson | |

FOREIGN PATENT DOCUMENTS

| | | |
|---|---|---|
| WO | WO2014/082115 A1 | 6/2014 |
| WO | WO2015/058181 A1 | 4/2015 |

OTHER PUBLICATIONS

International Search Report for PCT/IB2015/058420 dated Jul. 14, 2016.

* cited by examiner

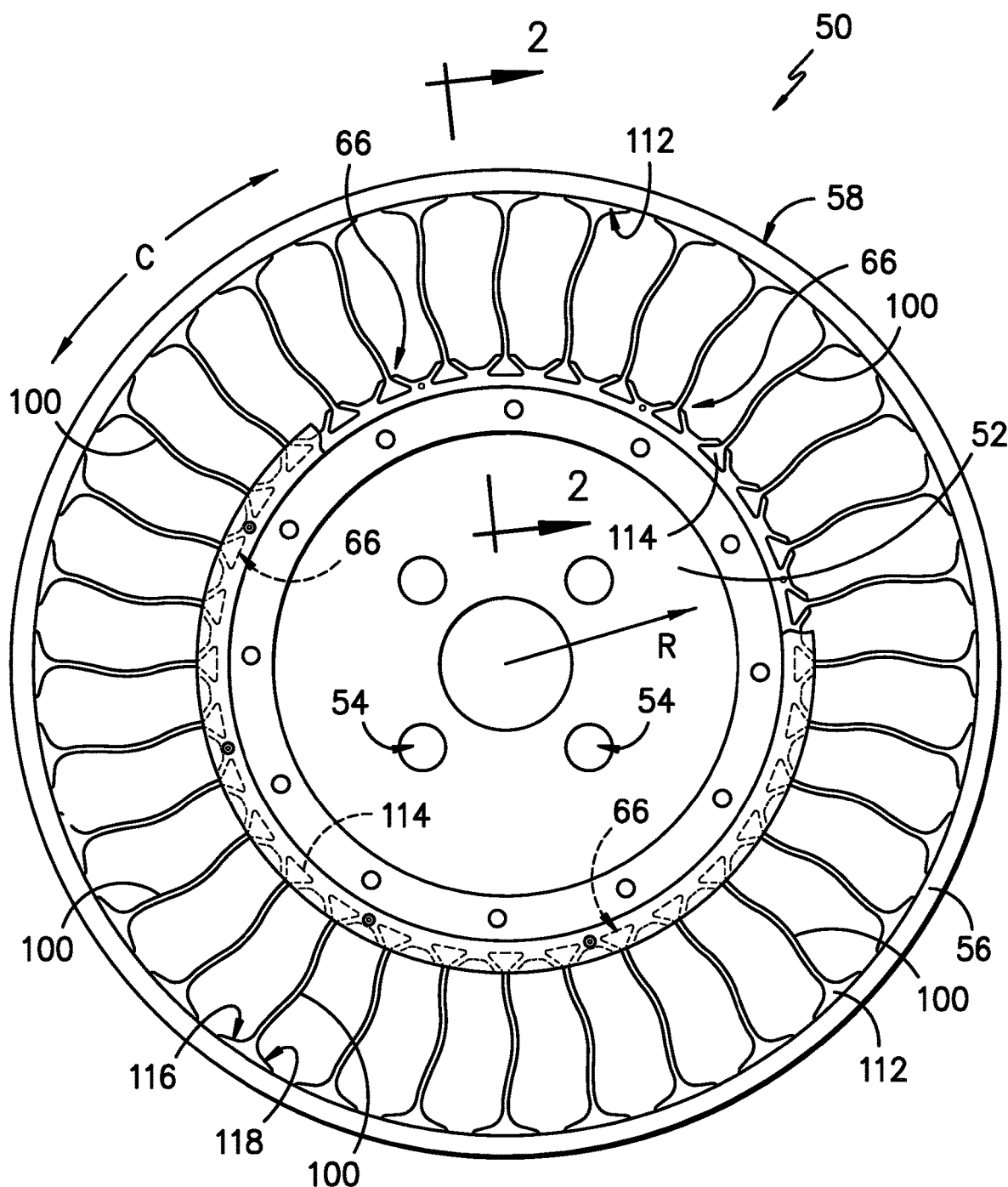
FIG. -1-

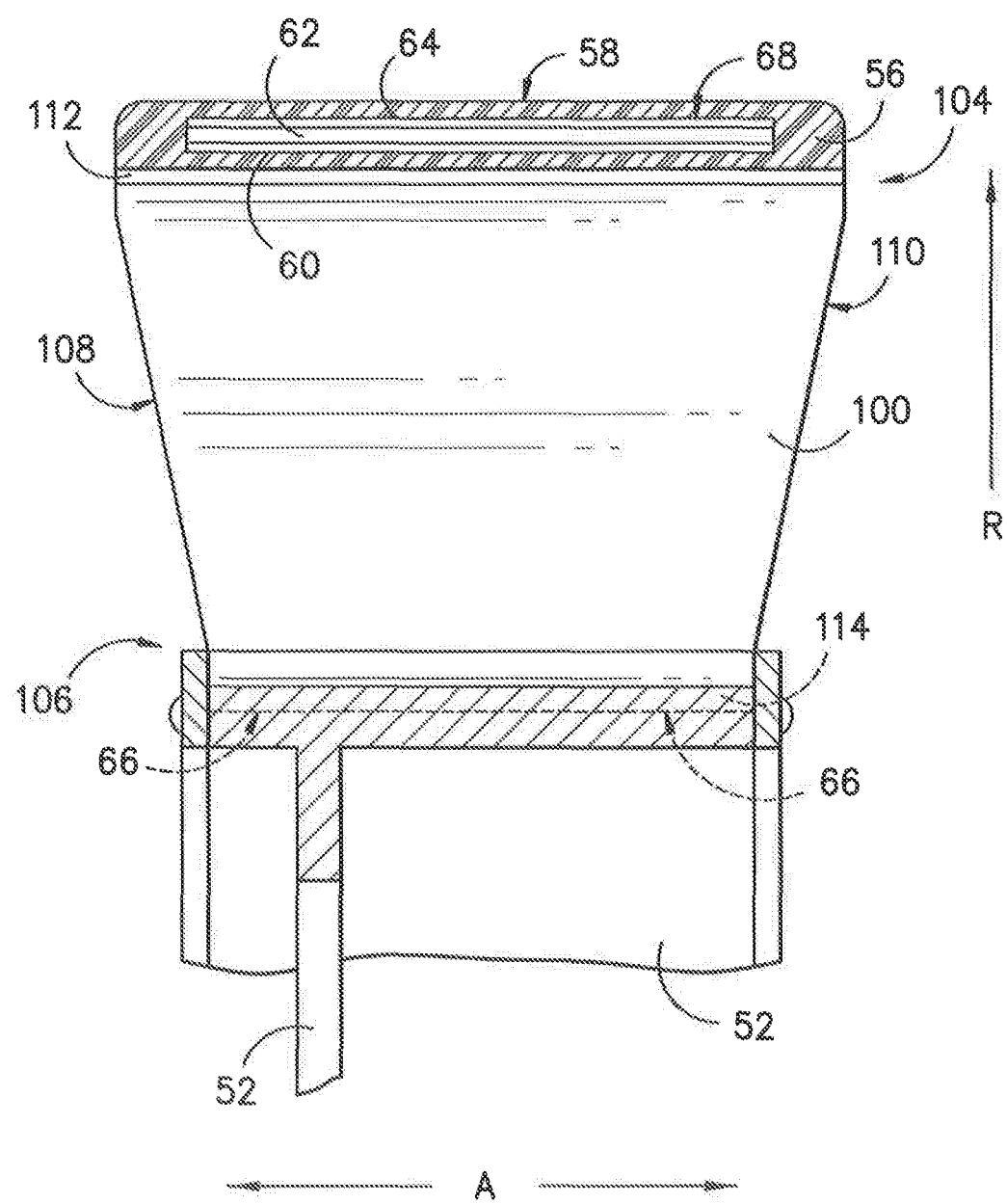
FIG. -2-

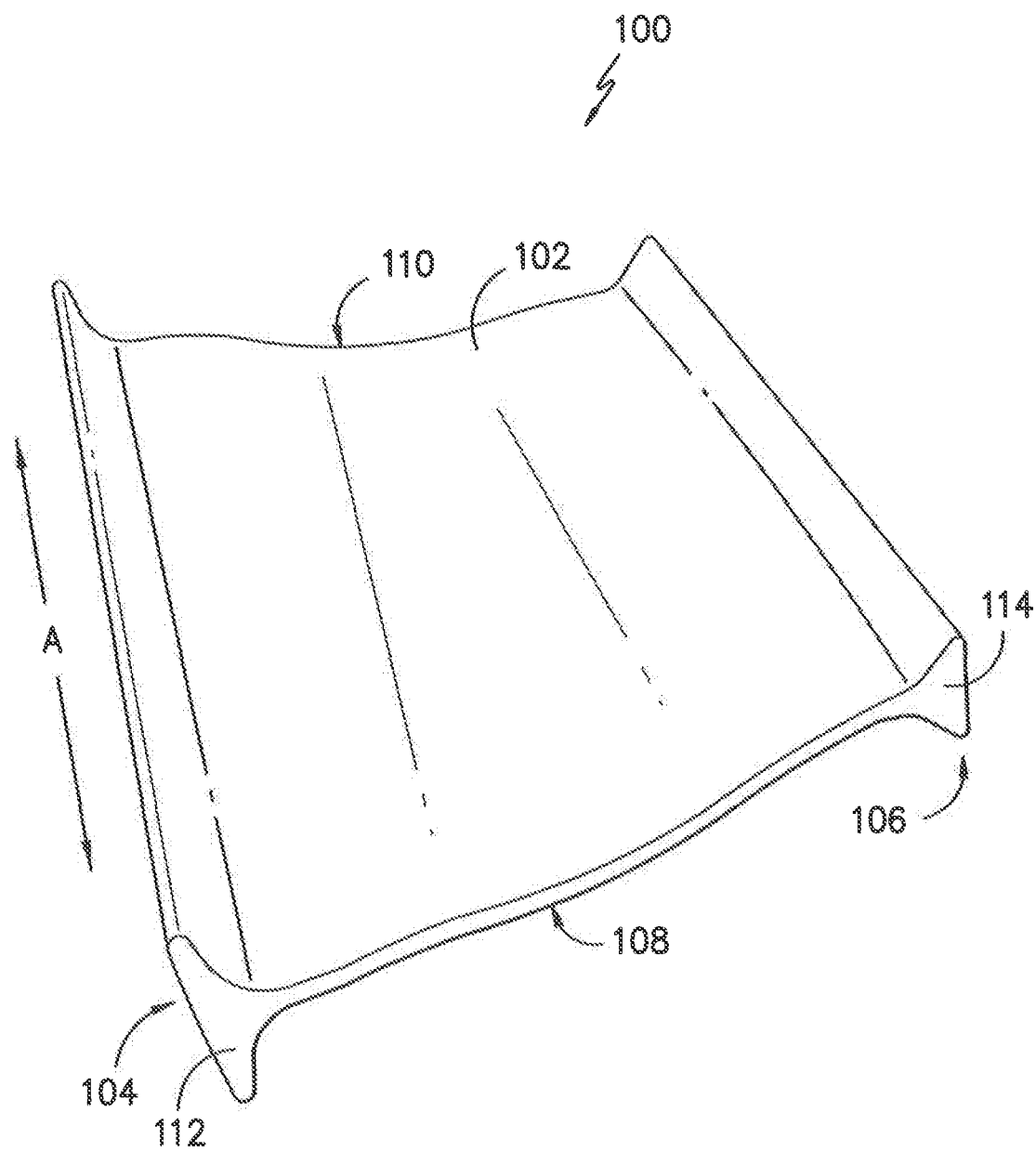
FIG. -3-

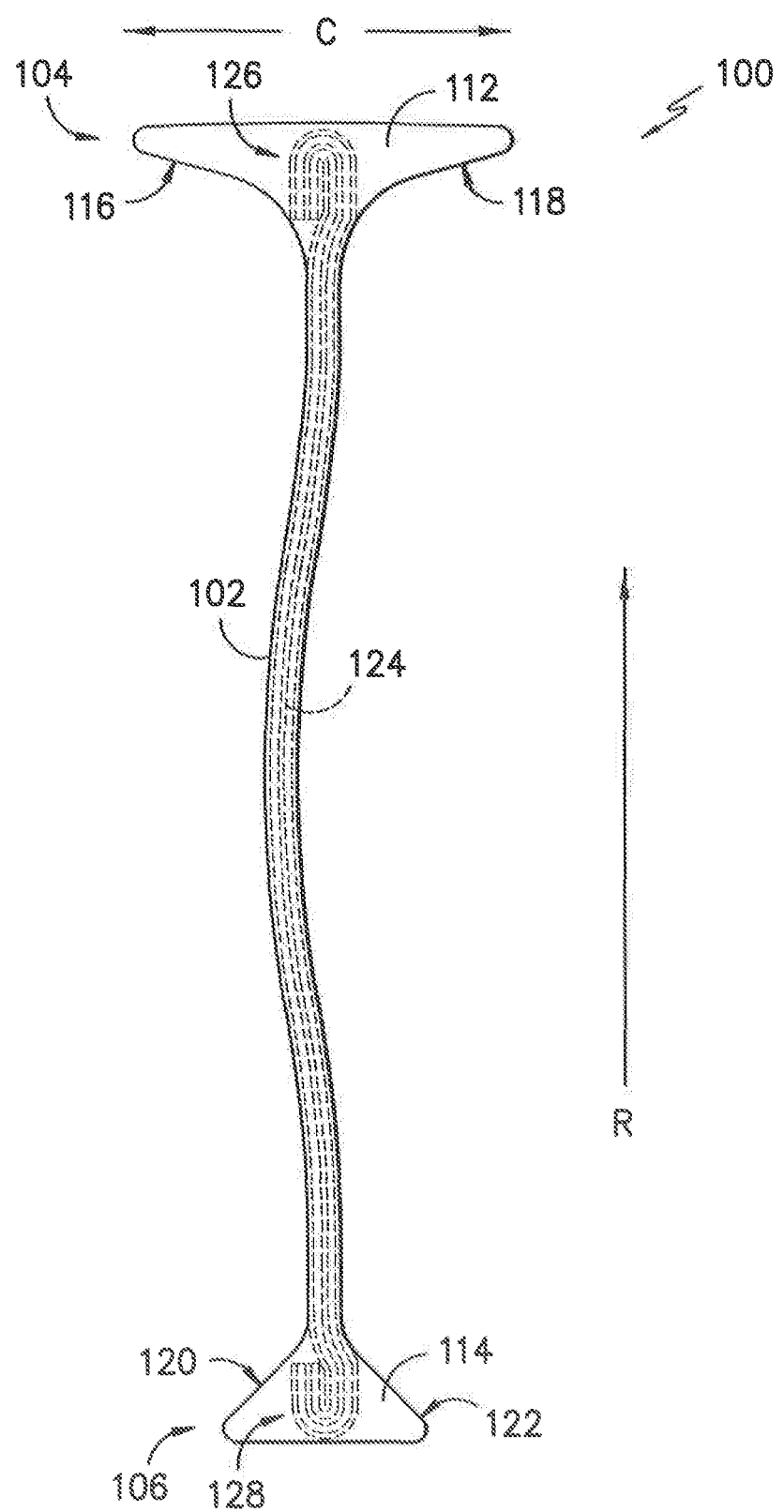
FIG. -4-

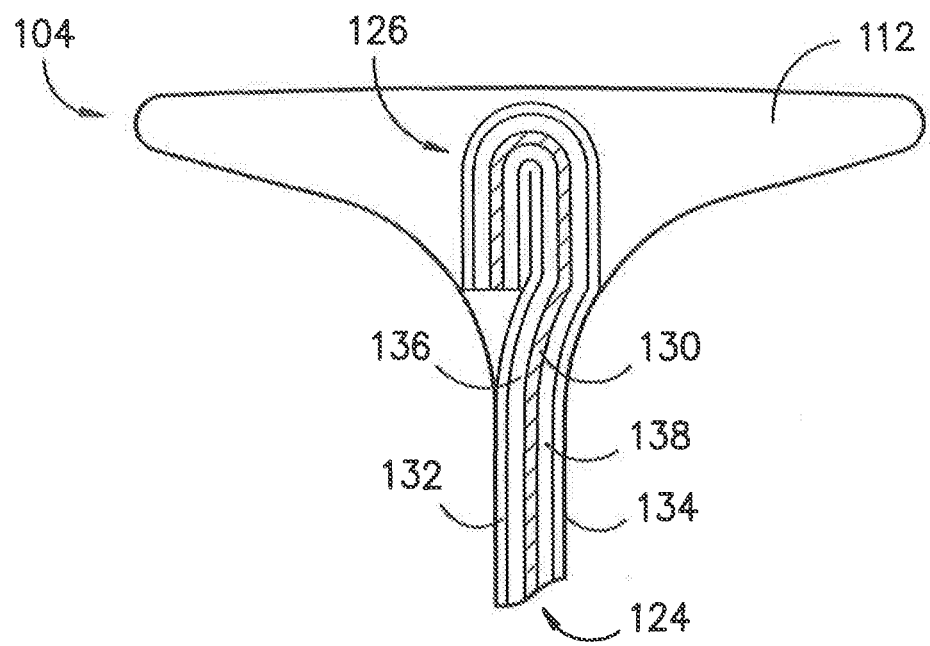
FIG. -5-
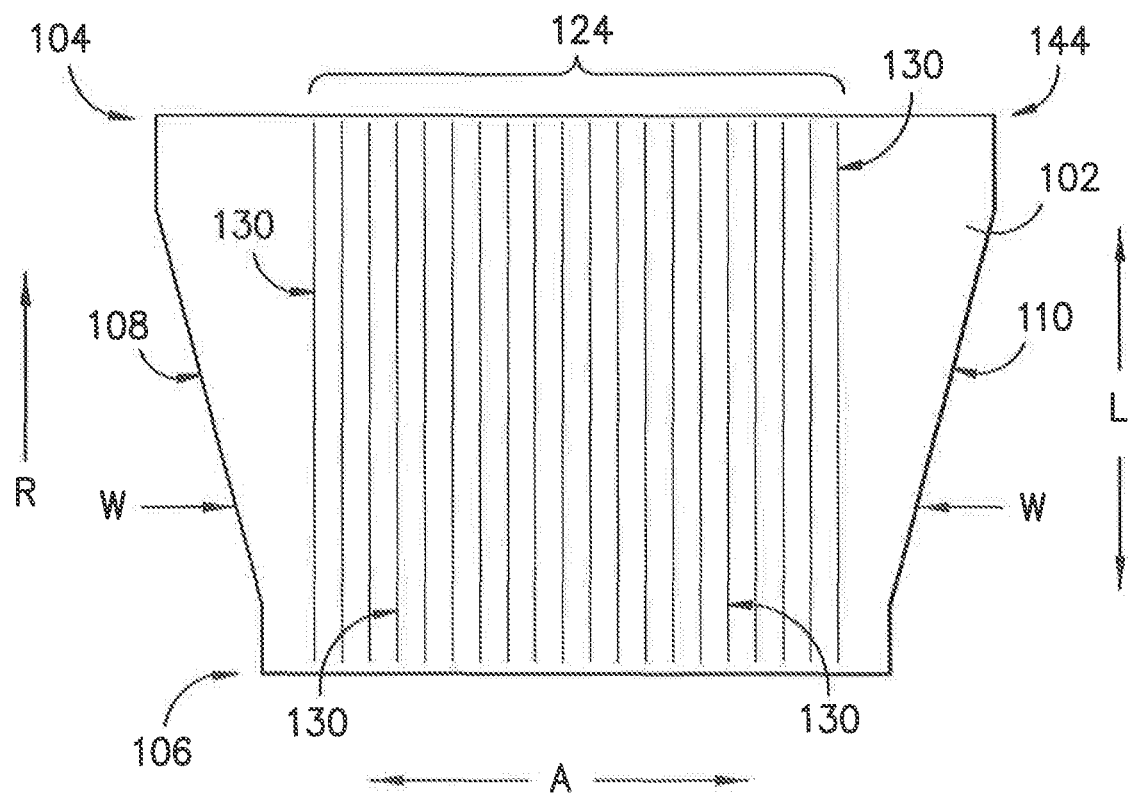
FIG. -6-

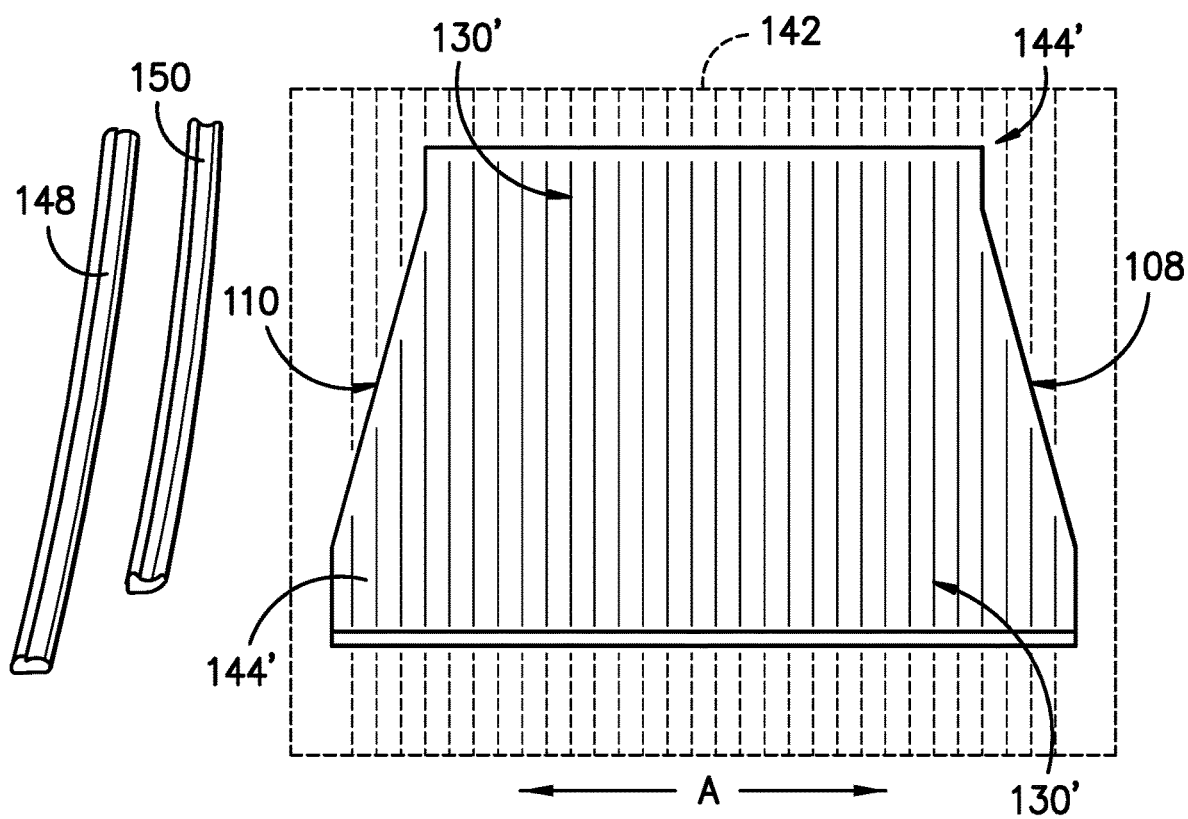
FIG. -7-
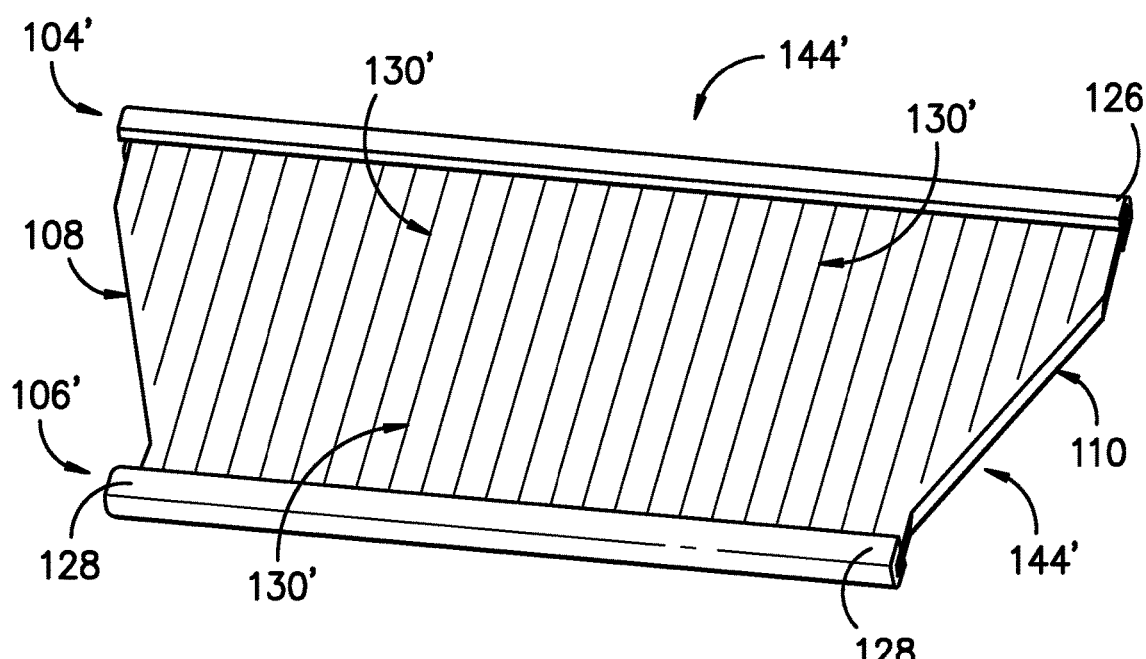
FIG. -8-

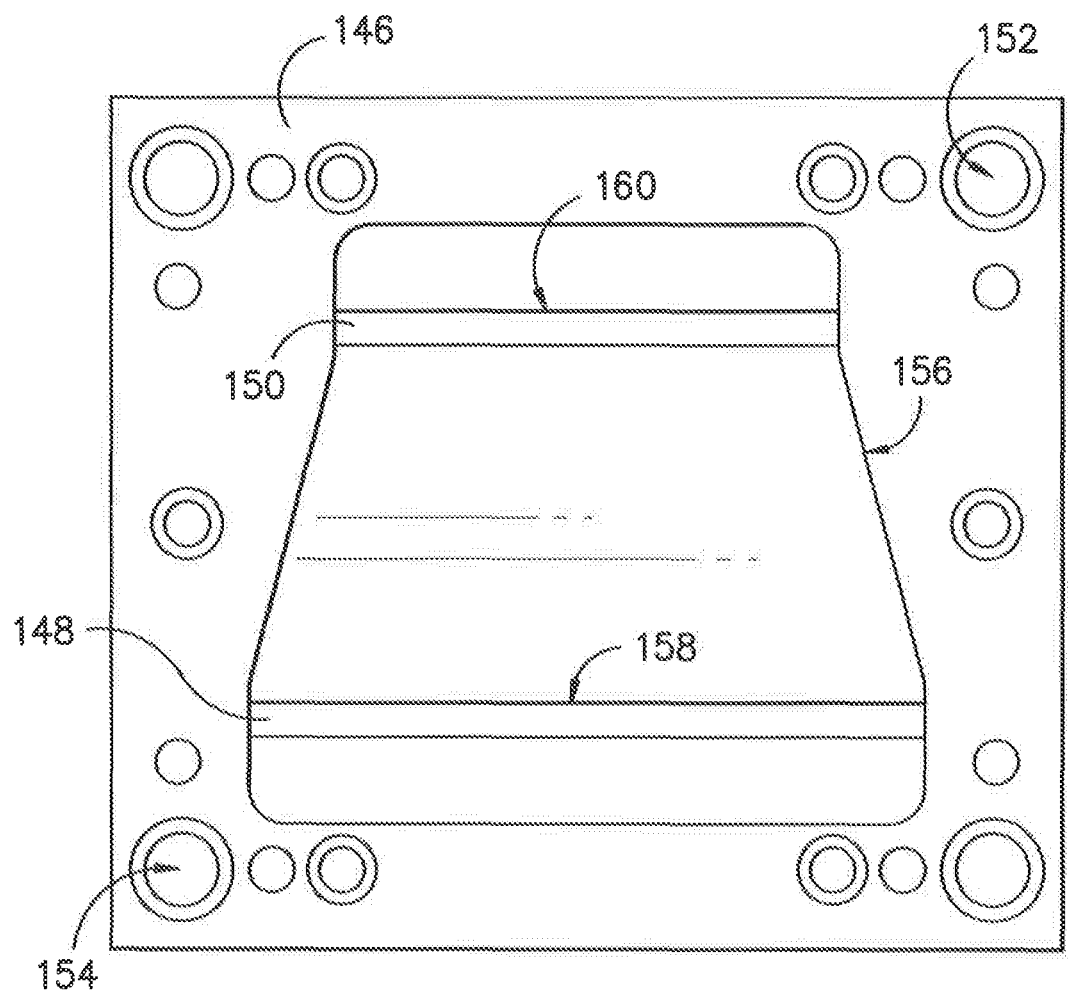
FIG. -9-

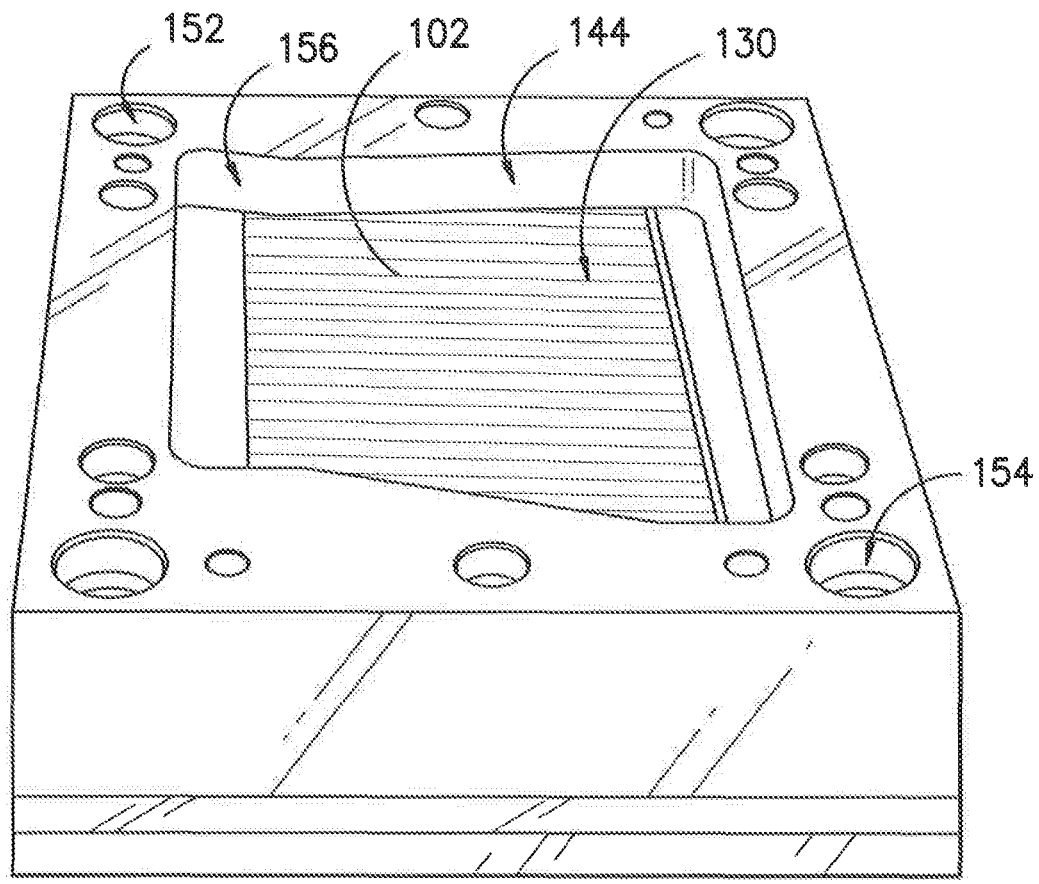
FIG. -10-

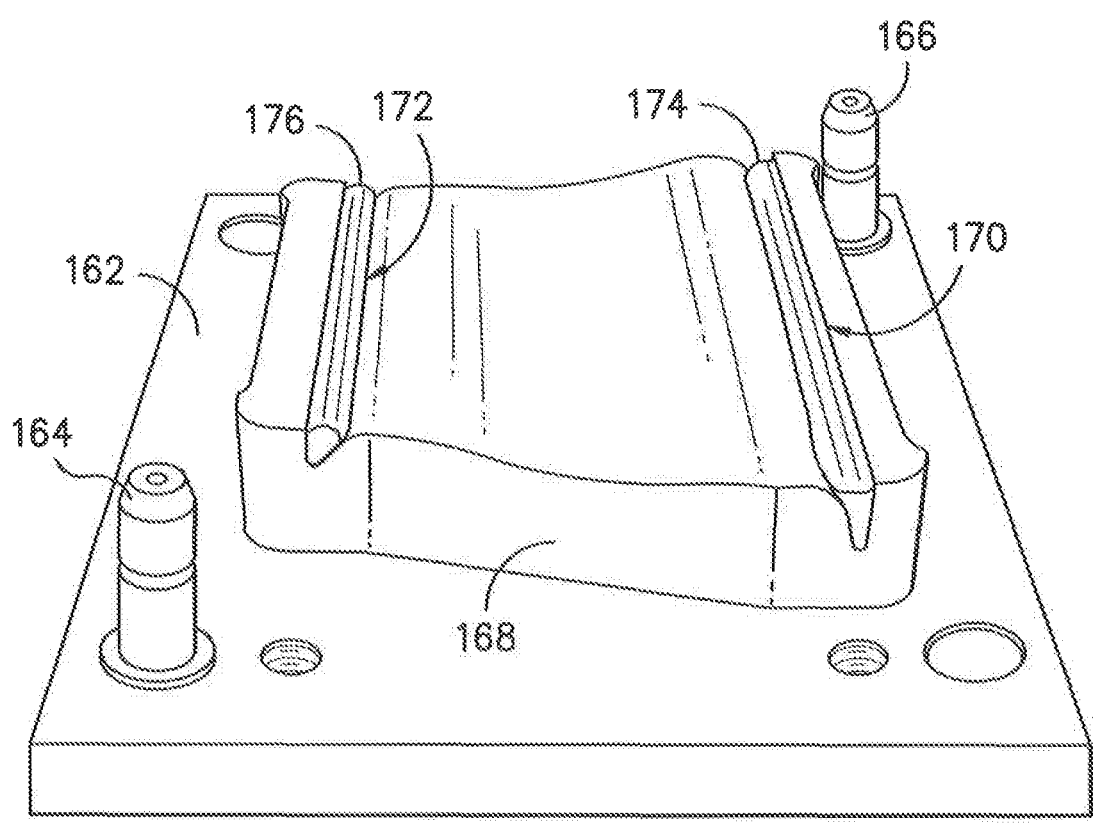
FIG. -11-

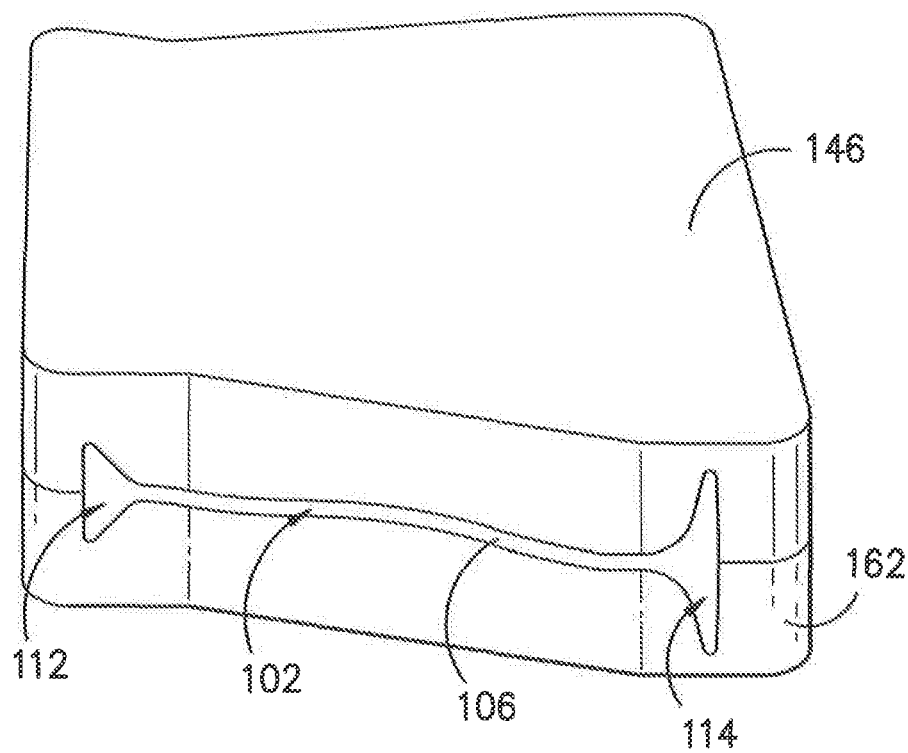
FIG. -12-
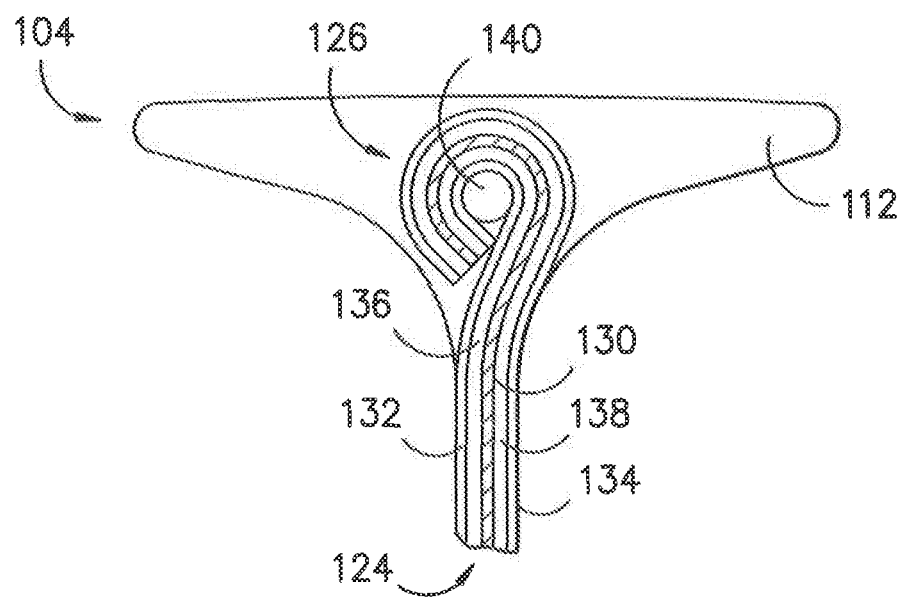
FIG. -13-

SPOKE FABRICATION FOR A NON-PNEUMATIC WHEEL

FIELD OF THE INVENTION

The present invention relates to spoke for a non-pneumatic wheel.

BACKGROUND OF THE INVENTION

Non-pneumatic wheel constructions and their benefits are described in e.g., U.S. Pat. Nos. 6,769,465; 6,994,134; 7,013,939; and 7,201,194, which are incorporated herein by reference in their entirety. Some non-pneumatic tire constructions propose incorporating a shear band, embodiments of which are described in e.g., U.S. Pat. Nos. 6,769,465 and 7,201,194. Such non-pneumatic tires provide advantages in tire performance without relying upon a gas inflation pressure for support of the loads applied to the tire.

In one example of a non-pneumatic wheel, a compliant band with a ground contacting portion can be connected with a plurality of tension-transmitting, web-like elements (i.e. spokes) extending radially from a center element or hub. For certain constructions, such non-pneumatic wheel may be formed by open cast molding in which a material such as e.g., polyurethane is poured into a mold that forms all or part of the non-pneumatic tire. One or more inextensible reinforcement structures such as cords may be molded in place in the compliant hand.

Typically, in such prior constructions, the spokes and the hub are molded as an integral, single-piece construction. Alternatively, the spokes may be integrally joined by a band that is then joined with a hub or wheel center. In either construction, the spokes are not readily removable from either the radially-outer end attached with the compliant band or the radially inner end attached to the hub or wheel center.

The construction of the spokes can affect the performance of the non-pneumatic wheel. Spokes constructed from different sizes, configurations, and materials of construction can affect the way tension is transmitted between the wheel hub and the compliant band, leading to differences in load carry capabilities of the non-pneumatic wheel and perceived handling characteristics. The density of the spokes can also determine e.g., how much tension each spoke carries as it rotates to the top of the wheel during operation.

Because of e.g., the integral construction, prior non-pneumatic wheel constructions are not readily amenable to substituting different spokes into the non-pneumatic wheel. Such a substitution would require destructive steps to cut or extricate both ends of the spoke from the wheel. Additionally, because the spokes are joined or attached with the wheel hub, the substitution of different wheels hubs of different materials or configuration is not readily feasible. Finally, prior manufacturing methods have not been conducive to incorporating reinforcements, shapes, layers of material, and other features into the construction of the spoke.

Accordingly, a spoke for a non-pneumatic wheel that can be more readily molded with reinforcements, various shapes, one or more layers of material, and other features would be useful. Such a spoke that can be readily incorporated into a non-pneumatic wheel without integral construction with the wheel hub would also be beneficial. A spoke that can be more readily connected and disconnected from the wheel hub, the compliant band, or both, would also be useful. A method of manufacturing such a wheel spoke would also be beneficial.

SUMMARY

The present invention provides an exemplary spoke for a non-pneumatic wheel. The spoke can be manufactured with a reinforcement structure having reinforcement elements and one or more layers of material. The spoke can also be provided in various shapes and configurations. The spoke includes anchors that allow the spoke to be more readily incorporated into, or removed from, a non-pneumatic wheel. More particularly, the anchors also allow the spoke to be joined as one-piece with the non-pneumatic wheel or releasably connected on one or both ends with the non-pneumatic wheel. Additional objects and advantages of the invention will be set forth in part in the following description, or may be apparent from the description, or may be learned through practice of the invention.

In one exemplary embodiment of the present invention, a spoke for a non-pneumatic wheel is provided. The wheel defines radial, axial, and circumferential directions. The spoke includes a web-like body extending along the radial direction between a radially-outer end and a radially inner end and extending along an axial direction between opposing edges of the web-like body.

The web like body includes a reinforcement structure extending along the radial direction and forming an outer fold at the radially-outer end and an inner fold at the radially-inner end. An outer anchor is positioned at the radially outer end and includes an outer pair of arms extending in an opposing manner along the circumferential direction away from the web-like body. An inner anchor is positioned at the radially inner end and includes an inner pair of arms extending in an opposing manner along the circumferential direction away from the web-like body.

The reinforcement structure may include a plurality of inextensible cords extending between the radially-outer end and the radially-inner end. The reinforcement structure may also include at least one pair of layers comprising a polymeric material, wherein the layers extend between the radially-outer end and the radially inner end with the inextensible cords embedded between the layers.

The spoke may also include an outer elongate rod positioned within the outer fold of the reinforcement structure; and an inner elongate rod positioned within the inner fold of the reinforcement structure. The inner elongate rod and the outer elongate rod may each extend along the axial direction between the opposing edges of the web-like body.

In another embodiment, the spoke may include a plurality of inextensible cords extending between the radially-outer end and the radially-inner end. A first pair of layers may include a first polymeric material, wherein the first pair of layers extend between the radially-outer end and the radially-inner end with the inextensible cords embedded between the first pair layers. A second pair of layers may include a second polymeric material, wherein the second pair of layers extend between the radially-outer end and the radially-inner end. The first polymeric material may have an elongation modulus MA10 measured at 10 percent elongation and at a temperature of 23° C. that is in the range of 1 to 10 MPa. The second polymeric material may have an elongation modulus MA10 measured at 10 percent elongation and at a temperature of 23° C. that is in the range of 1 to 5 MPa.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of an exemplary non-pneumatic wheel incorporating an exemplary embodiment of a spoke of the present invention.

FIG. 2 provides a cross-sectional view of the exemplary non-pneumatic wheel taken along line 2-2 of FIG. 1.

FIG. 3 illustrates a perspective view of an exemplary embodiment of a web spoke of the present invention can be used in the exemplary non-pneumatic wheel of FIG. 1.

FIG. 4 is an end view of the exemplary web spoke of FIG. 3.

FIG. 5 provides a close-up, cross-sectional end view of the radially-outer end of an exemplary spoke of the present invention.

FIG. 6 provides a front view of an exemplary precursor used in making the exemplary spoke of FIG. 3.

FIG. 7. is a perspective view of exemplary intermediates used in making the exemplary spoke of FIG. 3.

FIG. 8 illustrates aspects of an exemplary method used in making the exemplary spoke of FIG. 3.

FIGS. 9, 10, and 11 illustrate additional aspects of an exemplary method of the present invention while also depicting a top view of a mold portion (FIG. 9), a perspective end view of the mold portion (FIG. 10), and a perspective end view of another mold portion (FIG. 11).

FIG. 12 is a perspective end view illustrating the mold portions joined together with an exemplary web spoke molded therebetween.

FIG. 13 is a close-up, cross-sectional end view of the radially-outer end of another exemplary spoke.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

As used herein, the following definitions apply.

Axial direction A refers to a direction parallel to an axis about which a referenced exemplary wheel rotates during use.

Radial direction R refers to a direction perpendicular to axial direction A with radially-outer or radially outward referring to a general direction from axial direction A, and radially-inner or radially inward referring to a general direction towards axial direction A.

Circumferential direction C refers to a direction defined by defined by the circumference of the wheel or the direction of its rotation about an axis.

FIG. 1 provides a side view of an exemplary non-pneumatic wheel 50 that can be manufactured using the present invention while FIG. 2 provides a cross-sectional view of wheel 50 taken along a meridian plane at line 2-2 in FIG. 1. The present invention is not limited to the particular shape, size, or appearance of the wheels shown in the figures. As will be understood using the teachings disclosed herein, wheels of other shapes, sizes, and appearances may be used as well.

Non-pneumatic wheel 50 includes a wheel hub 52 provided with a series of apertures 54 through which threaded lugs or other fasteners may be inserted in order to mount wheel 50 onto a vehicle. Other mounting configurations may be used as well. Non-pneumatic wheel 50 also includes a compliant, load supporting band 56 positioned radially outward of a hub 52 and positioned concentrically with hub 52. A tread 58 may be formed on, or provided as part of, load supporting band 56. For example, tread band 58 may be adhered to load supporting band 56, embedded therein, or formed integrally as shown in FIG. 2. Other constructions may be used as well.

A plurality of tension-transmitting web elements or spokes 100 extend along the radial direction R between hub 52 and load supporting band 56. Spokes 100 are adjacent to one another and spaced apart about circumferential direction C of wheel 50. Spokes 100 may have other shapes and configurations from what is shown in FIGS. 1 and 2. Spokes 100 may also be formed at various angles from radial direction R. Using shear hand 68, load supporting band 56 supports loads transmitted non-pneumatic wheel 50 when mounted to a vehicle using mounting disk 52. The load is transmitted by tension through spokes 100 to compliant hand 56. In one exemplary embodiment, as wheel 50 rotates, spokes 100 are in tension as they reach the top of the wheel at a position away from the contact patch while spokes 100 near the contact patch may experience minimal tension and may even slightly buckle or bend.

By way of example, load supporting band 56 may be constructed to include shear band 68 having an inner reinforcing band 60, outer reinforcing band 64, and a shear layer 62 positioned therebetween. Shear layer 62 may be constructed e.g. of an elastomeric material such as e.g., natural and synthetic rubbers, polyurethanes, foamed rubbers and polyurethanes, segmented copolyesters, and block co-polymers of nylon. The reinforcing bands 60, 64 may include reinforcements constructed from e.g., essentially inextensible cord reinforcements embedded in an elastomeric coating. Such reinforcements may include e.g., any of several materials suitable for use as tire belt reinforcements in conventional tires such as cords of steel, composites of glass and resin such as e.g., fiberglass reinforced plastics, and other materials having a high modulus in tension and compression. Other constructions and materials may be used as well.

Referring now to FIGS. 2, 3, and 4, spoke 100 includes a web-like body 102 extending along the radial direction R. Arrow R points along a radial direction and from radially-inward to radially-outward when used in reference to the position and orientation of spoke 100 or its components within non-pneumatic wheel 50 (FIG. 1). Along radial direction R, web-like body 102 extends between a radially outer end 104 and a radially-inner end 106. Along axial direction A, web-like body 102 extends between opposing edges 108 and 110.

The radially outer end 104 of web-like body 102 forms an outer anchor 112 while the radially-inner end 106 forms inner anchor 114 (FIG. 4). For this exemplary embodiment, outer anchor 112 includes an outer pair of arms 116 and 118 that extend in an opposing manner or away from each other and body 102 along circumferential direction C. Similarly, inner anchor 114 includes an inner pair of arms 120 and 122 that extend in opposing manner or away from each other and body 102 along circumferential direction C. The present invention is not limited to the particular shape for web spoke 100 shown in the figures and other shapes and configurations may also be used. For example, while web spoke 100 has a familiar "I" shape as shown in FIG. 3 with triangular portions for anchors 112 and 114, other shapes can be used as well.

Anchors 112 and 114 provide versatility to the use of spoke 100 and its integration into wheel 50. For example, as shown in FIGS. 1 and 2, inner anchor 114 is removably installed within an axially-oriented slot or groove 66 of hub 52. During manufacture, inner anchor 114 can be readily slid along axial direction A or otherwise inserted into groove 66. Such construction also allows hub 52 to be readily substituted in the event of a desired change, repair, or otherwise.

For this exemplary embodiment, outer anchor 112 is attached to load support band 56. A variety of methods may be used to attach band 56 and outer anchor 112. For example, outer anchor 112 may be mechanically fastened or adhered to band 56. Alternatively, outer anchor 112 could be integrally formed with band 56. Other constructions may also be used.

Referring to FIG. 4, web-like body 102 includes a reinforcement structure 124. As shown, reinforcement structure 124 extends along radial direction R between radially-outer end 104 and radially-inner end 106. At radially-outer end 104, reinforcement structure 124 is provided with an outer fold 126. At radially-inner end 106, reinforcement structure 124 includes an inner fold 128. Folds 126 and 128 provide strength to spoke 100 while also helping secure the ends of reinforcement structure 124 in anchors 112 and 114. As such, folds 126 and 128 help reinforcement structure 124 ensure that the tensile forces experienced by web spoke 100 as it rotates away from the contact patch (the area of tread 58 in contact with the ground) and moves to the top of wheel 50 during use are transmitted between hub 52 and compliant band 56.

A variety of shapes may be used for web-like body 102. For example, as shown in FIG. 6, web-like body 102 has a width W that increases along radial direction R moving from the radially-inner end 106 to radially-outer end 104. In other embodiments, width V may decrease, remain constant, or vary. Additionally, the thickness T of web-like body 102 along circumferential direction C may be uniform as shown in FIG. 3 or may vary along radial direction R.

For this exemplary embodiment, as depicted in FIGS. 4, 5, and 6, reinforcement structure 124 includes a plurality of elongate, reinforcement elements 130. In one exemplary embodiment, reinforcement elements 130 are provided as inextensible cords 130 extending adjacent and parallel to each other along radial direction R. More particularly, for this embodiment, reinforcement elements 130 have a length that extends along radial direction R—i.e. reinforcement elements 130 extend longitudinally along radial direction R. Other orientations may be used.

For one exemplary embodiment, as used herein, "inextensible" means the material has an elongation at break of 12 percent or less as measured at 23° C. according to ASTM 885. By way of example, cords 130 may be constructed from nylon, steel, combinations thereof, and other materials as well. Cords 130 may be positioned across the entire axial width W of web-like body 102 so that cords 130 are near edges 108 and 110 (FIGS. 7 and 8) or, alternatively, may be positioned across only a portion of width W such that cords 130 are spaced apart from edges 108 and 110 (FIG. 6).

Referring to FIGS. 4 and 5, reinforcement structure 124 can include a plurality of layers of polymeric material to form web-like body 102 as well. For example, in one exemplary embodiment, reinforcement structure 124 includes at least one pair of layers of polymeric material 136 and 138 with inextensible cords 130 embedded or sandwiched between layers 136 and 138. Layers 136 and 138 extend between the radially-outer end 104 and radially-inner end 106 and, therefore, have substantially the same length and shape as reinforcement structures 124.

For this exemplary embodiment, layers 136 and 138 form a first pair of layers immediately adjacent to cords 130 and a second pair of layers 132 and 134 are positioned outside of first pair of layers 136, 138. As with layers 136 and 138, layers 132 and 134 extend between the radially-outer end 104 and radially inner end 106 and, therefore, have substantially the same length and shape as reinforcement structures 124. Layers 132, 134, 136, and 138 are folded at radially-out ends 104 and 106 as shown in FIG. 4.

Various materials can be used for layers 132, 134, 136, and 138. In one exemplary embodiment of the invention, first pair of layers 136, 138 are constructed from a first polymeric material while second pair of layers 132, 134 are constructed from a second polymeric material. For example, the first polymeric material may have e.g., an elongation modulus MA10 (according to ASTM D412) measured at 10 percent elongation and at a temperature of 23° C. that is in the range of 1 to 10 MPa (megapascals). The second polymeric material may have e.g., an elongation modulus MA10 (according to ASTM D412) measured at 10 percent elongation and at a temperature of 23° C. that is in the range of 1 to 5 MPa. The first and second polymeric materials may be constructed of elastomeric materials that are tacky such that e.g., they will self-adhere or stick to themselves and/or each other during manufacture.

Various materials may be used for outer anchor 112 and inner anchor 114. For example, outer anchor 112 may be constructed from a polymeric material having e.g., an elongation modulus MA10 (according to ASTM D412) measured at 10 percent elongation and at a temperature of 23° C. that is in the range of 10 to 30 MPa (megapascals). Inner anchor 114 may be constructed from a polymeric material having e.g., an elongation modulus MA10 (according to ASTM D412) measured at 10 percent elongation and at a temperature of 23° C. that is in the range of 20 to 60 MPa (megapascals), FIG. 13 provides another exemplary embodiment for web spoke 100. As shown, the embodiment of FIG. 13 is similar to the embodiment of FIG. 5 except that an elongated rod 140 is contained within outer fold 126 of reinforcement structure 124. The length of rod 140 extends along axial direction A between edges 108 and 110. A similar construction may be used to place a rod in inner fold 128 of reinforcement structure 124. Such rods can be constructed from e.g., metal, fiberglass-reinforced composites, or combinations thereof. Rods within folds 126 and 128 provide additional support for securing folds 126 and 128 in anchors 112 and 114.

An exemplary method of manufacturing a spoke, such as e.g., spoke 100, for a non-pneumatic will now be set forth. Using the teachings disclosed herein, one of skill in the art will understand that the exemplary method may be used with other exemplary aspects of the invention as well to provide additional exemplary methods. As used herein, the term "method" or "process" refers to one or more steps that may be performed in other ordering than shown without departing from the scope of the presently disclosed invention. Any sequence of steps is exemplary and is not intended to limit methods described herein to any particular sequence, nor is it intended to preclude adding steps, omitting steps, repeating steps, or performing steps simultaneously. As used herein, the term "method" or "process" may include one or more steps performed at least by one electronic or computer-based apparatus having a processor for executing instructions that carry out the steps.

In one exemplary aspect, the present invention provides an exemplary method of manufacturing a spoke such as web spoke 100 for a non-pneumatic wheel. Referring to FIG. 7, one or more sheets 142 of polymeric material are provided from which a precursor 144 (FIG. 8) of the web-like body 102 is formed by cutting sheets 142 in the shape desired. For example, sheet 142 may include sheets stacked or sandwiched together to provide layers 132, 134, 136, and 138 as described with regard to FIG. 5 with elongate reinforcement elements 130 positioned between layers 136 and 138. Sheet 142 may be arranged such that the reinforcement elements 130 are positioned along radial direction R.

FIG. 7 also depicts outer anchor strips 148 and 150 that will be joined with precursor 144 as described later. In one exemplary aspect, the layers forming sheet 142 and used to form precursor 144 include one or more uncured, rubber materials. For example, the first and second polymeric materials used in layers 132, 134, 136, and 138 may initially include uncured rubber where these layers are not cross-linked to one another.

As shown in FIG. 8, after cutting precursor 144 from sheet 142, a radially outer end 104 is folded to form outer fold 126 in precursor 144. Similarly, a radially-inner end 106 is folded to form inner fold 128 in precursor 144. The references to radially-outer and radially-inner are with regard to the position such features will occupy within non-pneumatic wheel 50. In one exemplary embodiment, the materials used to form the outer layers 132 and 134 of precursor 144 are tacky or self-adhering. As such, folds 126 and 128 can be readily created by folding and pressing ends 104 and 106 back against precursor 144. A tool having e.g., an edge or flat surface can be used to help press precursor 144 and create folds 126 and 128.

FIG. 9 provides a top view of a first mold portion 146 defining a recess 156. Recess 156 includes an axially-oriented groove 158 into which outer anchor strip 148 is placed. Recess 156 also includes an axially-oriented groove 160 (shown here as parallel to groove 158) into which an inner anchor strip 150 is placed. A tool having an edge or other flat surface can be used to press strips 148 and 150 into their respective grooves 158 and 160, respectively. Strips 148 and 150 form a portion of outer anchor 112 and inner anchor 114, respectively.

Referring to FIG. 10, after positioning anchor strips 148 and 150, precursor 144 (which will form web-like body 102) is placed into recess 156 of first mold portion 146. Precursor 144 is carefully pressed into contact with strips 148 and 150 and against the molding surfaces of first mold portion 146. A tool having an edge or flat surface can be used to help press precursor 144 against strips 148 and 150. As shown, precursor 144 has an overall shape that matches with the shape of recess 156.

As illustrated in FIG. 11, a second mold portion 162 is provided with a relief or projection 168 that mates in complementary fashion with recess 156 in first mold portion 146. Second mold portion 162 also includes posts 164 and 166 that are inserted into openings 152 and 154 of first mold portion 146 when portions 146 and 162 are combined and pressed. Projection 168 defines a pair of parallel grooves 170 and 172.

Another outer anchor strip 174 is placed into axially-oriented groove 170 and another inner anchor strip 176 is placed into axially-oriented groove 172. A flat edge or other tool can be used to tightly press strips 174 and 176 into grooves 170 and 172. Strips 174 and 176 form a portion of anchors 112 and 114, respectively.

As shown in FIG. 12, first mold portion 146 and second mold portion 164 are joined together so as to combine precursor 144 and all anchor strips 148, 150, 174, and 176. Heat is applied to mold portion 146 and 164 so as heat precursor 144 and all anchor strips 148, 150, 174, and 176. Pressure may also be applied to squeeze mold portions 146 and 164 together during such heating and thereby press the materials contained therein. In one exemplary embodiment, the application of heat and pressure is maintained until the precursor 144 and all anchor strips 148, 150, 174, and 176 are joined and cross-linked together to form an integral web spoke 100. For example, in one exemplary embodiment, heat is maintained until a temperature of 150° C. to 180° C. is achieved for at least a period of 10 to 20 minutes. After allowing sufficient time for curing, web spoke 100 can be removed from mold portions 146 and 164.

The present invention is not limited to the particular shapes or configurations of mold portions 146 and 164. Others may be used to provide e.g., different shapes and configurations for web spoke 100.

In an alternative, exemplary aspect of the present invention, web spoke 100 or embodiments thereof may be manufactured from e.g., polyurethane or silicone elastomers. Various molding, processes may be used to manufacture web spoke 100 from such materials including e.g., injection molding, compression molding, or casting. For example, in an injection molding process, reinforcements 130 would be placed in a mold in the shape of web spoke 100. The mold would then be injected with e.g., polyurethane or silicone elastomers. After the materials are allowed to cure, the web spoke 100 would be removed from the mold.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A spoke for a non-pneumatic wheel defining radial, axial, and circumferential directions, the spoke comprising:
    a web-like body extending along the radial direction between a radially-outer end and a radially inner end and extending along an axial direction between opposing edges of the web-like body, the web like body comprising a reinforcement structure extending along the radial direction and forming an outer fold at the radially-outer end and an inner fold at the radially-inner end;

an outer anchor positioned at the radially outer end and comprising an outer pair of arms extending in an opposing manner along the circumferential direction away from the web-like body; and an inner anchor positioned at the radially inner end and comprising an inner pair of arms extending in an opposing manner along the circumferential direction away from the web-like body.

2. The spoke for a non-pneumatic wheel as in claim 1, wherein the reinforcement structure comprises a plurality of inextensible cords extending between the radially-outer end and the radially-inner end.

3. The spoke for a non-pneumatic wheel as in claim 2, wherein the inextensible cords comprise steel.

4. The spoke for a non-pneumatic wheel as in claim 2, wherein the inextensible cords comprise fiber reinforced plastics.

5. The spoke for a non-pneumatic wheel as in claim 1, wherein the reinforcement structure comprises:

a plurality of inextensible cords extending between the radially-outer end and the radially-inner end; and at least one pair of layers comprising a polymeric material, wherein the layers extend between the radially-outer end and the radially inner end with the inextensible cords embedded between the layers.

6. The spoke for a non-pneumatic wheel as in claim 1, wherein the reinforcement structure comprises:

a plurality of inextensible cords extending between the radially-outer end and the radially-inner end; and a first pair of layers comprising a first polymeric material, wherein the first pair of layers extend between the radially-outer end and the radially-inner end with the inextensible cords embedded between the first pair layers; and a second pair of layers comprising a second polymeric material, wherein the second pair of layers extend between the radially-outer end, and the radially-inner end.

7. The spoke for a non-pneumatic wheel as in claim 6, wherein the first polymeric material has an elongation modulus MA10 measured at 10 percent elongation and at a temperature of 23° C. that is in the range of 1 to 10 MPa.

8. The spoke for a non-pneumatic wheel as in claim 6, wherein the second polymeric material has an elongation modulus MA10 measured at 10 percent elongation and at a temperature of 23° C. that is in the range of 1 to 5 MPa.

9. The spoke for a non-pneumatic wheel as in claim 1, wherein the reinforcement structure comprises a plurality of inextensible cords extending between the radially-outer end and the radially-inner end, and wherein the inextensible cords are positioned in a parallel and adjacent manner along the axial direction and are positioned near the opposing edges of the web-like body.

10. The spoke for a non-pneumatic wheel as in claim 9, wherein along the axial direction between the opposing edges the web-like body has a width that increases along the radial direction from the radially-inner end to the radially-outer end.

11. The spoke for a non-pneumatic wheel as in claim 1, further comprising:

an outer elongate rod positioned within the outer fold of the reinforcement structure; and an inner elongate rod positioned within the inner fold of the reinforcement structure;

wherein the inner elongate rod and the outer elongate rod each extend along the axial direction between the opposing edges of the web-like body.

12. The spoke for a non-pneumatic wheel as in claim 11, wherein the inner elongate rod and the outer elongate rod each comprise a fiberglass material.

13. The spoke for a non-pneumatic wheel as in claim 1, wherein the outer anchor comprises a polymeric material having an elongation modulus MA10 measured at 10 percent elongation and at a temperature of 23° C. that is in the range of 10 to 30 MPa.

14. The spoke for a non-pneumatic wheel as in claim 1, wherein the inner anchor comprises a polymeric material having an elongation modulus MA10 measured at 10 percent elongation and at a temperature of 23° C. that is in the range of 20 to 60 MPa.

* * * * *